United States Patent
Wormald (10) Patent No.: US 8,346,893 B2
(45) Date of Patent: Jan. 1, 2013

(54) MOBILE WIRELESS COMMUNICATIONS DEVICE TO DISPLAY A REMAINING CONTENT PORTION OF A WEB ARTICLE AND ASSOCIATED METHODS

(75) Inventor: Chris Wormald, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 119 days.

(21) Appl. No.: 12/392,236

(22) Filed: Feb. 25, 2009

(65) Prior Publication Data

US 2010/0217838 A1 Aug. 26, 2010

(51) Int. Cl.
*G06F 15/16* (2006.01)

(52) U.S. Cl. ........ 709/219; 709/217; 709/203; 709/206; 709/247; 709/229; 715/239; 715/201; 715/249; 455/414.1; 455/466; 455/423

(58) Field of Classification Search .................. 709/219, 709/217, 203, 206, 247, 229; 715/239, 201, 715/249; 455/414.1, 466, 423
See application file for complete search history.

(56) References Cited

U.S. PATENT DOCUMENTS

| | | | |
|---|---|---|---|
| 7,210,099 B2 * | 4/2007 | Rohrabaugh et al. | 715/249 |
| 7,461,353 B2 * | 12/2008 | Rohrabaugh et al. | 715/815 |
| 7,809,406 B2 * | 10/2010 | Weinans | 455/566 |
| 2007/0067305 A1 * | 3/2007 | Ives | 707/10 |
| 2008/0005668 A1 * | 1/2008 | Mavinkurve et al. | 715/526 |
| 2008/0160967 A1 * | 7/2008 | Narasimhan et al. | 455/414.1 |
| 2009/0005087 A1 * | 1/2009 | Lunati et al. | 455/466 |

OTHER PUBLICATIONS http://www.patenthawk.com/blog/, "The Patent Prospector," Patent Hawk, 2009.
http://blog.viigo.com/, Viigo Blog, Viigo, 2008.

* cited by examiner

*Primary Examiner* — Wing F Chan
*Assistant Examiner* — Benjamin M Thieu
(74) *Attorney, Agent, or Firm* — Allen, Dyer, Doppelt, Milbrath & Gilchrist, P.A.

(57) ABSTRACT

A mobile wireless communications device includes a processor cooperating with a wireless transceiver for displaying on a display a linking web page including a plurality of introductory content portions of linked web articles having hyperlinks associated therewith. User selection of a corresponding hyperlink for a given linked web article is permitted via at least one input device. Content of the given linked web article is searched to determine a remaining content portion after the introductory content portion. At least part of the remaining content portion is displayed on the display.

20 Claims, 6 Drawing Sheets

MOBILE WIRELESS COMMUNICATIONS DEVICE TO DISPLAY A REMAINING CONTENT PORTION OF A WEB ARTICLE AND ASSOCIATED METHODS

TECHNICAL FIELD

The present disclosure relates to the field of mobile wireless communications devices and, more particularly, to mobile wireless devices to display linked web articles and associated methods.

BACKGROUND

The World Wide Web has become a service platform that competes with traditional media, such as newspapers and magazines, for timely content publication, aggregation, and delivery. Such content may be delivered via a web page, for example. Other such content may be delivered via a RSS (Really Simple Syndication) feed. RSS is a type of web feed allowing the broadcast, or syndication, of content that is frequently updated, such as blog entries, news headlines, audio, and video, in a standardized format. An RSS document (which is also called a "feed," "web feed," or "channel") includes full or summarized text, plus metadata such as publishing dates and authorship. RSS feeds benefit publishers by letting them syndicate content quickly and automatically. They benefit readers who want to subscribe to timely updates from favored websites.

A standardized XML (Extensible Markup Language) file format allows the information to be published once via an RSS feed and viewed by many different programs. The RSS feed may be subscribed to and viewed with a web browser or a specific web feed reader. The web browser or feed reader checks the user's subscribed feeds regularly, downloads any updates that it finds, and provides a user interface to monitor and read the feeds.

The display of web pages and web feeds on a mobile wireless communications device has become desirable. However, the display of such on a mobile wireless communications device presents challenges not present in the display of web pages or web feeds on a traditional personal computer, such as a laptop. A mobile wireless communications device typically has a small screen with a limited viewing area. Therefore, a user of a mobile wireless communications device may be required to scroll through a large amount of advertisements or other information on a web page or web feed before reaching the content (e.g. a news article) that he wishes to read. Furthermore, a mobile wireless communications device may have an Internet connection that is relatively slow in comparison to an internet connection used by a personal computer.

Such user annoyances may arise when a user browsing a linking web page chooses a linked web article he would like to read by selecting a hyperlink associated with the linked web article. Rather than displaying the content portion of the linked web article when the hyperlink is selected, a conventional mobile wireless communications device displays the entire linked web article itself, which may include advertisements or other undesired content.

One way to provide a web article that opens directly to its content portion (for ease of reading by a user of a mobile wireless communications device) is by embedding certain tags in the HTML or XML file of the web article. For example, if creating both a linking web page and a linked web article, a web author may embed an "anchor" tag in both the linking web page and the linked web article to facilitate such a function.

The HTML tag <a name="article1">News Article 1</a> may be embedded at the place in the linked web article where the content portion thereof begins. Likewise, <a href="http://www.article1.com/main.html#article1">Read Article 1</a> may be embedded as a hyperlink on the linking web page. When a user clicks on the Read Article 1 hyperlink on the linking web page, the linked web article will be displayed on the user's mobile wireless communications device starting from the location of the anchor tag. Of course, this solution requires that the appropriate HTML or XML tags be embedded into the both the linking web page and the linked web article, and is of no help to users viewing sites without such features.

Accordingly, a need remains for a mobile wireless communications device that facilitates easy and quick reading of a linked web article.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

A mobile wireless communications device comprises at least one input device, a display, a wireless transceiver, and a processor cooperating with the wireless transceiver. The processor may be for displaying on the display a linking web page including a plurality of introductory content portions of linked web articles having hyperlinks associated therewith. The processor may also be for permitting user selection of a corresponding hyperlink for a given linked web article via the at least one input device. In addition, the processor may be for searching content of the given linked web article to determine a remaining content portion after the introductory content portion, and displaying on the display at least part of the remaining content portion.

The linking web page may comprise a markup language file stored on a remote server and the linked web articles may comprise markup language files stored on remote web servers. Furthermore, the processor may search the markup language file of the given linked web article when searching content of the given linked web article.

The markup language file of the linking web page may comprise at least one of an HTML file and an XML file. Also, the markup language files of the linked web articles may each comprise at least one of an HTML file and an XML file.

The processor may further download a fraction of the remaining content portion from a remote server at a given time. Moreover, the processor may further download successive fractions of the remaining content portion from a remote server based upon the at least one input device.

The at least one input device may comprise a scrolling input device. The linked web articles may comprise web feeds and/or the linking web page may comprise a web feed aggregator page. The mobile wireless communications device may have a portable housing carrying the at least one input device, the display, the wireless transceiver, and the processor.

Another aspect is directed to a method of displaying a linked web article on a mobile wireless communications device. The method may comprise displaying on a display of the mobile wireless communications device a linking web page including a plurality of introductory content portions of linked web articles having hyperlinks associated therewith. User selection of a corresponding hyperlink for a given linked web article may be permitted via at least one input device of the mobile wireless communications device. Content of the given linked web article may be searched to determine a remaining content portion after the introductory content portion. At least part of the remaining content portion may be displayed on the display.

Figure 1:
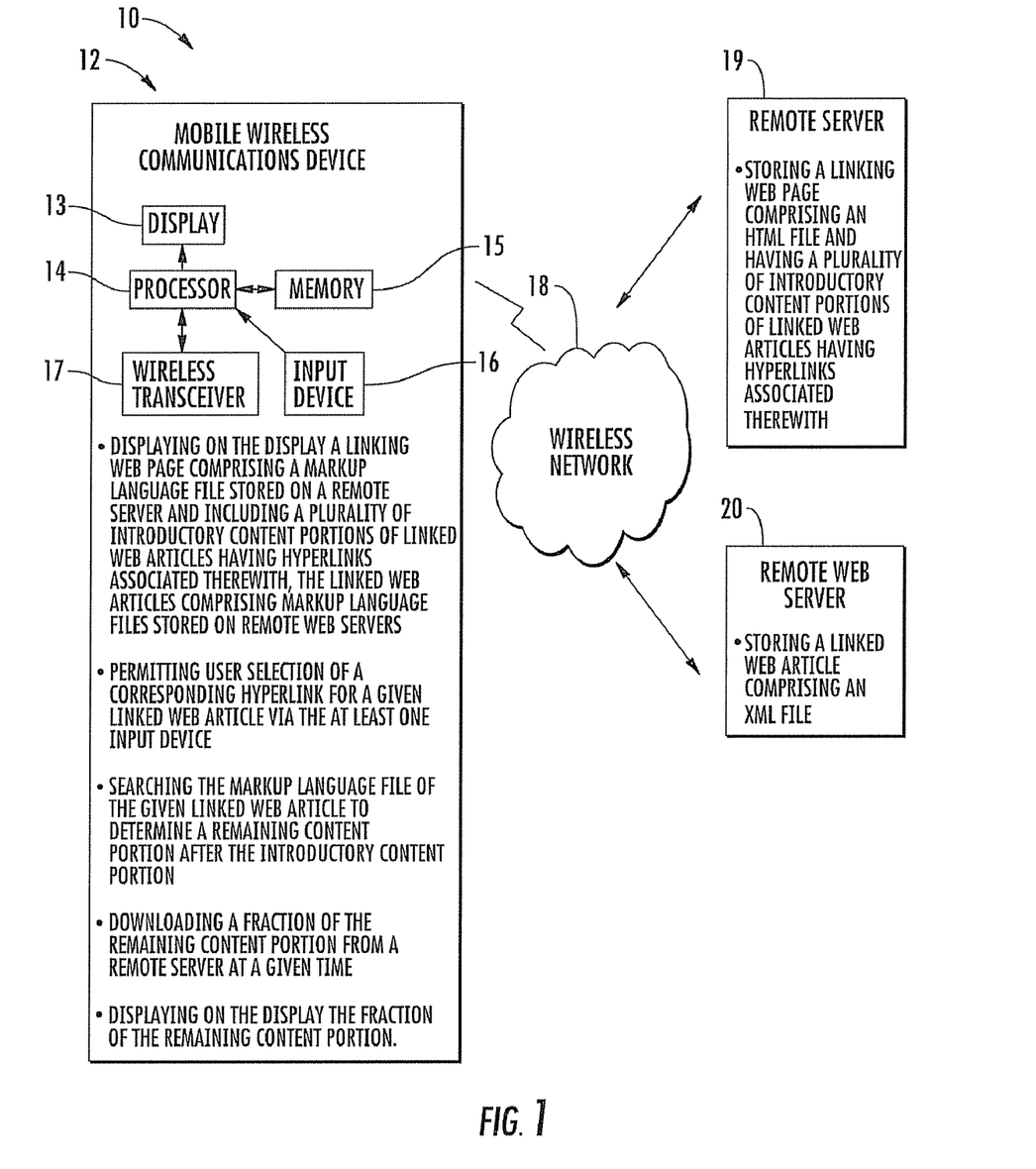
FIG. 1 is a schematic block diagram of a communications system including a mobile wireless communications device in accordance with the present embodiment.

With reference to FIG. 1 a communications system 10 including a mobile wireless communications device 12 to display a linked web article is now described. Of course, there may be a plurality of mobile wireless communications devices 12. The system 10 includes a wireless network 18 that may typically be provided by a cellular telephone network. The mobile wireless communications device 10 comprises a processor 14 coupled to a display 13, a memory 15, a wireless transceiver 17, and an input device 16. The input device 16 is illustratively a keyboard, for example. The input device 16 may also be a microphone or a wireless receiver, as will be appreciated by those of skill in the art. Of course, the display 13 may be a touch sensitive screen and may therefore also serve as the input device 16. In addition, the mobile wireless communications device 10 includes a portable housing 21 and a rechargeable battery (not shown).

The processor 14 cooperates with the memory 15 and the wireless transceiver 17 for communicating with remote server 19 and remote web server 20. The remote server 19 illustratively stores a linking web page comprising a HTML file but, of course, the linking web page may comprise any markup language file. The linking web page has a plurality of introductory content portions of linked web articles having hyperlinks associated therewith. The remote web server 20 stores the linked web articles which comprise XML files. It should be recognized that the linked web articles need not comprise XML files and, indeed, may comprise any suitable markup language files. It should be noted that the remote server 19 and the remote web server 20 may store any number of linking web pages and linked web articles, respectively.

The processor 14 of the mobile wireless communications device 10 cooperates with the memory 15 and the wireless transceiver 17 for displaying on the display 13 the linking web page, including the plurality of introductory content portions of linked web articles and the hyperlinks associated therewith.

User selection of a corresponding hyperlink for a given linked web article is permitted via the keyboard 16. That is, a user may select the hyperlink associated with a given linked web article he would like to read. The processor 14 of the mobile wireless communications devices 10 cooperates with the memory 15 and the wireless transceiver 17 for searching content of the given linked web article to determine a remaining content portion after the introductory content portion. To search the content of the given linked web article, the processor 14 searches the XML file of the given linked web article.

A fraction of the remaining content portion is downloaded from the remote web server 20 at a given time. The fraction of the remaining content portion is displayed on the display 13. Downloading a fraction of the remaining content portion at a given time permits the mobile wireless communications device 10 to display the content to the user more quickly.

Furthermore, the display of the remaining content portion on the display 13 has advantageously skipped over the introductory portion of the linked web article which a user will have already read. Further, undesirable portions of the linked web article that are above the remaining content portion will be skipped and not displayed to the user. This may greatly enhance the user experience, as reading linked web articles on conventional mobile wireless communications devices may require a user to scroll or skip through large portions of the linked web article to find the remaining content portion. Of course, the entire remaining content portion may, alternatively, be downloaded from the remote web server 20 at a given time and may be displayed on the display 13.

Figure 2:
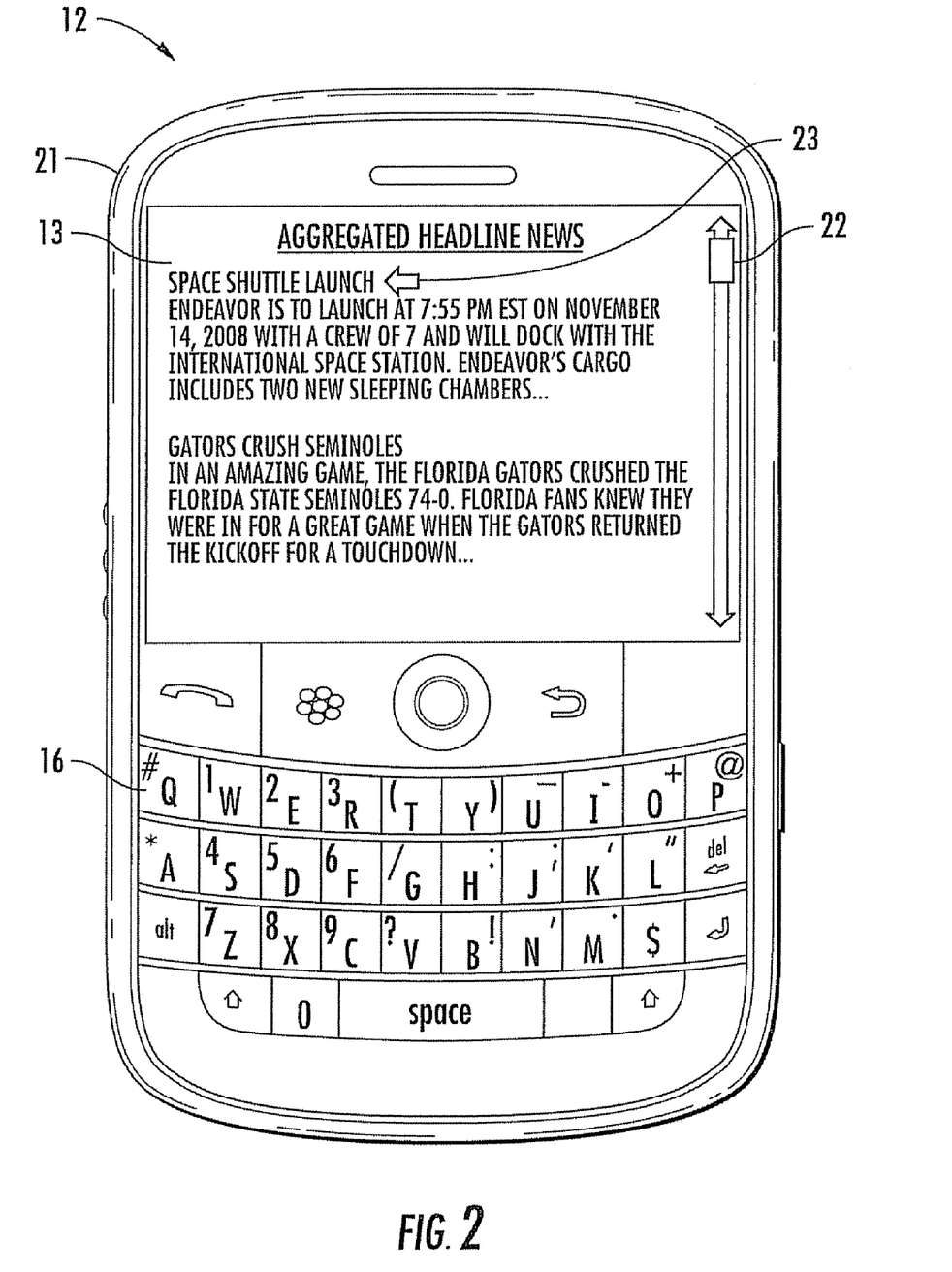
FIG. 2 shows the mobile wireless communications device of FIG. 1 displaying a linking web page.
Figure 3:
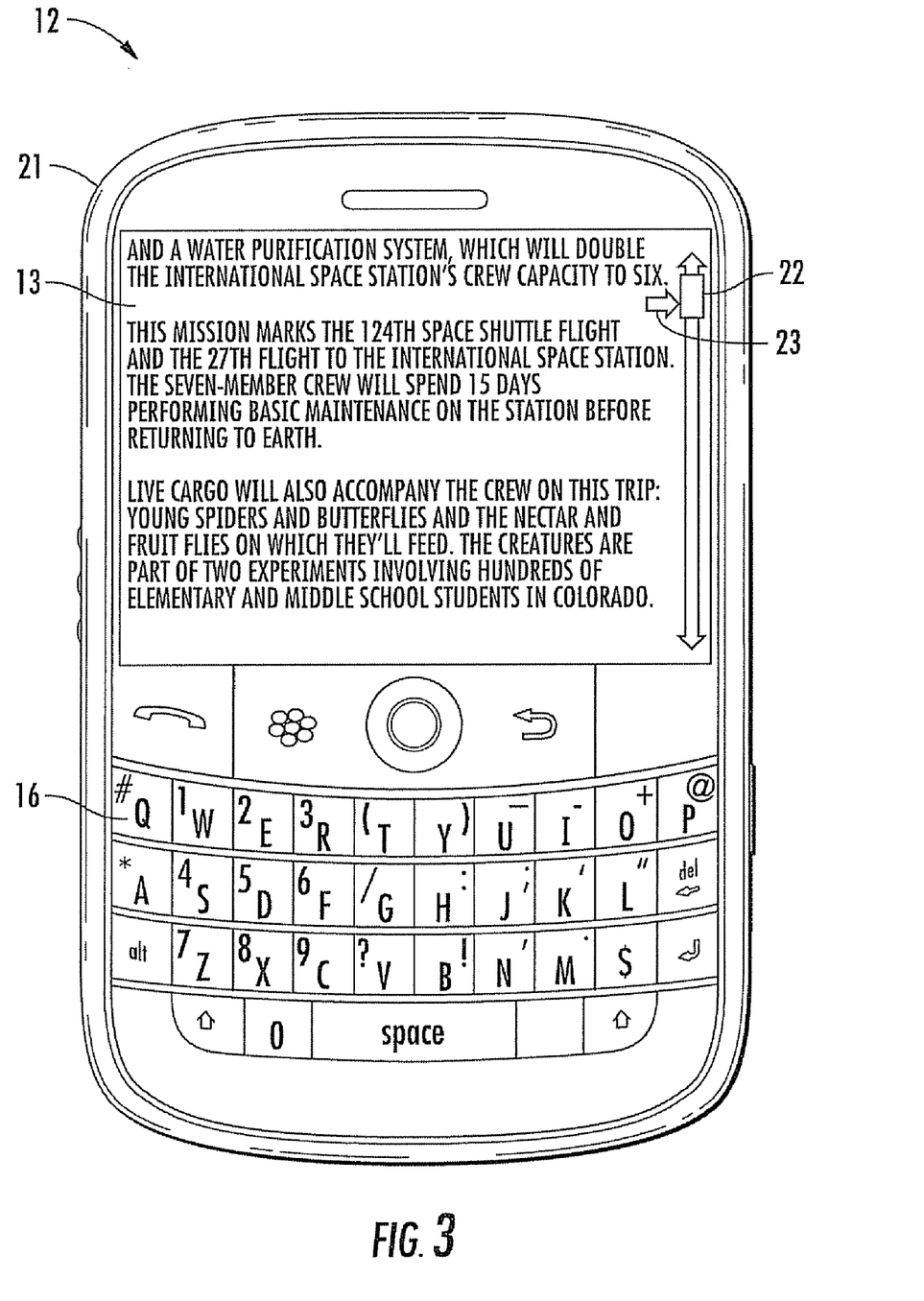
FIG. 3 shows the mobile wireless communications device of FIG. 1 displaying a content portion of a linked web article.

Operation of the mobile wireless communications device 10 is now further described by way of example with reference to FIGS. 2-3. As shown in FIG. 2, the mobile wireless communications device 10 is displaying a web feed aggregator page having a plurality of introductory content portions of linked web articles thereon. In this example, the articles are illustratively "Space Shuttle Launch" and "Gators Crush Seminoles." Each of the articles has an introductory content portion displayed below and the article titles themselves are hyperlinks. As also shown in FIG. 2, the user has illustratively selected the hyperlink associated with the linked web article "Space Shuttle Launch" by using the input device. The arrow 23 next to the hyperlink shows the user selection.

The introductory portion of this linked web article states that "Endeavor is to launch at 7:55 PM EST on Nov. 14, 2008 with a crew of 7 and will dock with the International Space Station. Endeavor's cargo includes two new sleeping chambers . . . ." Shown in FIG. 3 are the results of the user selecting the hyperlink associated with this linked web article. A fraction of the remaining content portion of the linked web article itself is now displayed on the display 13. It should be noted that the fraction of the remaining content portion continues directly from where the introductory portion left off and recites "and a water purification system, which will double the International Space Station's crew capacity to six," which completes the sentence of the introductory portion.

The processor 14 further downloads successive fractions of the remaining content portion from the remote web server 20 based upon the keyboard 16. The processor 14 downloads fractions of the remaining content portion at a time so that the linked web article may be displayed to the user more quickly. Furthermore, bandwidth of the wireless network 18 may be conserved because fractions of the linked web article may never be downloaded (if a user never scrolls the display 13 thereto).

Figure 4:
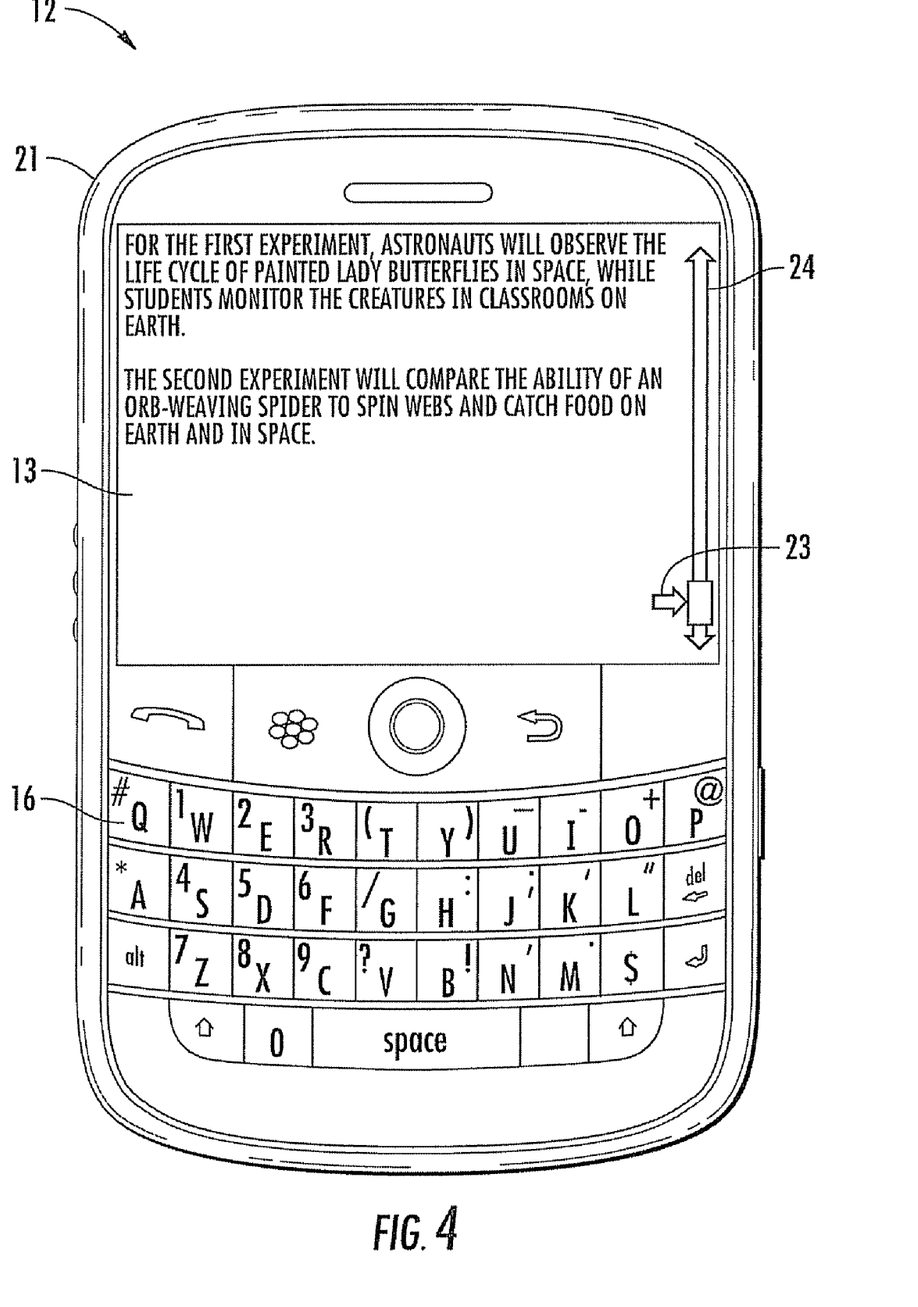
FIG. 4 shows the mobile wireless communications device of FIG. 1 displaying a content portion of a linked web article wherein the content portion has been scrolled upward on the display.

As shown in FIG. 4, the user has illustratively used the keyboard 16 to move the pointer 23 to a scroll bar 24 and has used the scroll bar to scroll the content portion displayed on the display 13 upwardly. A successive fraction of the remaining content portion of the linked web article has been downloaded and is now displayed on the display 13.

This use of the keyboard 16 to advance the content portion displayed on the display 13 using a scroll bar 24 makes the keyboard a scrolling input device. Additionally or alternatively to the scroll bar 24, the user may use the keyboard 16 to skip to a next page of the web article. Of course, the mobile wireless communications device 10 may have additional input devices 16, such as a trackball or thumbwheel.

It should be noted that the linking web page displayed by the display 13 in FIG. 2 is a web feed aggregator page and that the linked web articles are web feeds. Of course, in other applications, the linking web page may instead be a mere web page and not a web feed aggregator page. Similarly, the linked web articles need not be web feeds and instead may be web pages.

Figure 5:
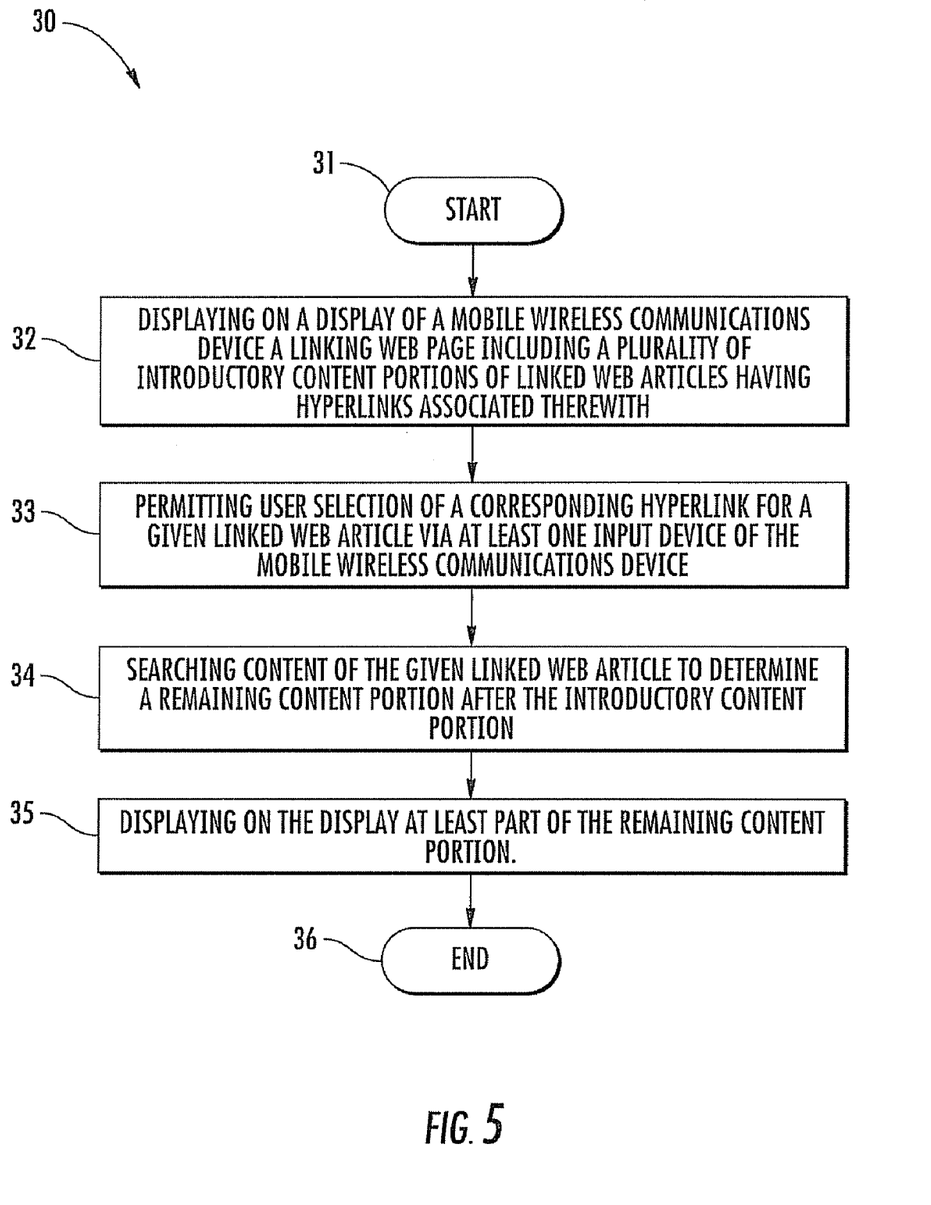
FIG. 5 is a flowchart of a method of displaying a linked web article on a mobile wireless communications device in accordance with the present embodiment.

With reference to flowchart 30 of FIG. 5, a method of displaying a linked web article on a mobile wireless communications device is now described. After the start (Block 31), at Block 32 a linking web page including a plurality of introductory content portions of linked web articles having hyperlinks associated therewith is displayed on a display of the mobile wireless communications device. At Block 33, user selection of a corresponding hyperlink for a given linked web article is permitted via at least one input device of the mobile wireless communications device.

At Block 34, content of the given linked web article is searched to determine a remaining content portion after the introductory content portion. At Block 35, at least part of the remaining content portion is displayed on the display. Block 36 indicates the end of the method.

Exemplary components of a hand-held mobile wireless communications device 1000 that may be used in accordance with the present invention are further described in the example below with reference to FIG. 6. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 6:
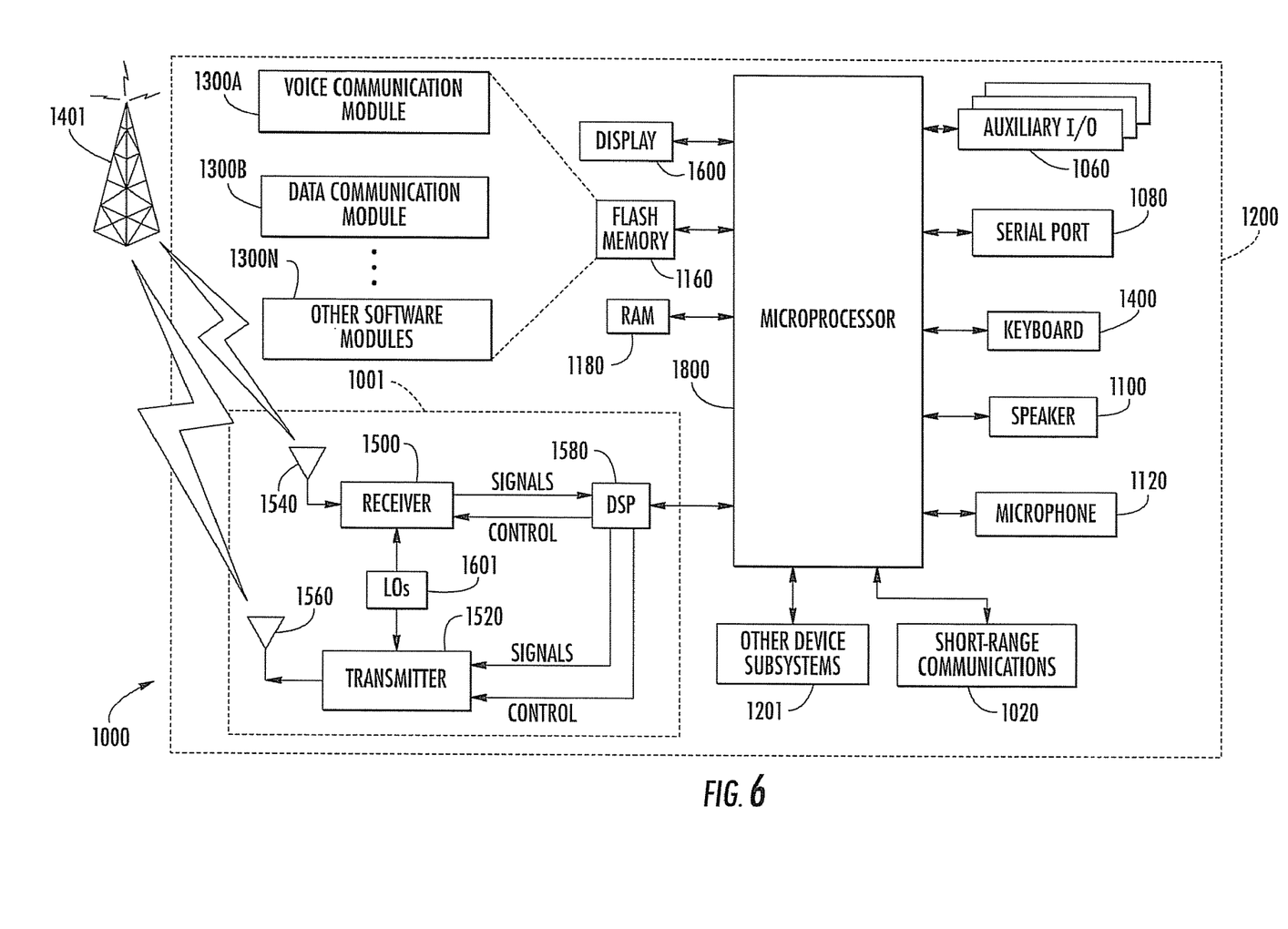
FIG. 6 is a schematic block diagram illustrating exemplary components of a mobile wireless communications device in accordance of the present embodiment.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
   at least one input device;
   a display;
   a wireless transceiver; and
   a processor cooperating with said wireless transceiver for
      displaying on said display a linking web page including a first content portion of a linked web article having a hyperlink associated therewith,
      permitting user selection of the hyperlink via said at least one input device,
      searching, responsive to the user selection, content of the linked web article to determine a subsequent content portion that immediately follows after the first content portion,
      downloading a fraction of the subsequent content portion from a remote web server at a given time, and
      displaying on said display at least part of the subsequent content portion without displaying the first content portion.

2. The mobile wireless communications device of claim 1 wherein the linking web page comprises a first markup language file stored on a first remote server; wherein the linked web article comprises a second markup language file stored on a second remote web server; and wherein said processor searches the second markup language file of the linked web article when searching content of the linked web article.

3. The mobile wireless communications device of claim 2 wherein the first markup language file of the linking web page comprises at least one of an HTML file and an XML file.

4. The mobile wireless communications device of claim 2 wherein the second markup language files of the linked web article comprises at least one of an HTML file and an XML file.

5. The mobile wireless communications device of claim 1 wherein said processor further downloads successive fractions of the content portion from a remote web server based upon said at least one input device.

6. The mobile wireless communications device of claim 5 wherein said at least one input device comprises a scrolling input device.

7. The mobile wireless communications device of claim 1 wherein the linked web article comprises a web feed.

8. The mobile wireless communications device of claim 1 wherein the linking web page comprises a web feed aggregator page.

9. The mobile wireless communications device of claim 1 further comprising a portable housing carrying said at least one input device, said display, wireless transceiver and said processor.

10. The mobile wireless communications device of claim 1, wherein the linking web page includes a plurality of additional first content portions, each additional first content portion of the plurality thereof for an additional linked web article, each linked web article having a hyperlink associated therewith; wherein said processor permits user selection of a hyperlink for a given linked web article via said at least one input device; wherein said processor is also for searching, responsive to the user selection, content of the given linked web article to determine a subsequent content portion after the first content portion thereof, and displaying on said display at least part of the subsequent content portion.

11. A mobile wireless communications device comprising:
   at least one input device;
   a display;
   a wireless transceiver; and
   a processor cooperating with said wireless transceiver for
      displaying on said display a linking web page comprising a first markup language file stored on a first remote server, wherein the linking web page includes a plurality of first content portions, each first content portion associated with a respective linked web article, each linked web article having a hyperlink associated therewith, each linked web article comprising a markup language file stored on a remote web server,
      permitting user selection of the hyperlink for a selected linked web article via said at least one input device,
      searching, responsive to the user selection, the markup language file of the selected linked web article to determine a subsequent content portion immediately after the first content portion associated with the selected linked web article,
      downloading a fraction of the subsequent content portion from a remote web server at a given time, and displaying on said display the fraction of the subsequent content portion without displaying the first content portion.

12. The mobile wireless communications device of claim 11 wherein the first markup language file of the linking web page comprises at least one of an HTML file and an XML file.

13. The mobile wireless communications device of claim 11 wherein the markup language file of the selected linked web article comprises at least one of an HTML file and an XML file.

14. The mobile wireless communications device of claim 11 wherein said processor further downloads successive fractions of the subsequent content portion from the remote web server based upon said at least one input device.

15. The mobile wireless communications device of claim 14 wherein said at least one input device comprises a scrolling input device.

16. A method of displaying a linked web article on a mobile wireless communications device, the method comprising:

displaying on a display of the mobile wireless communications device a linking web page including a first content portion of a linked web article having a hyperlink associated therewith;

permitting user selection of the hyperlink via at least one input device of the mobile wireless communications device;

searching, responsive to the user selection, content of the linked web article to determine a subsequent content portion immediately after the first content portion;

downloading a fraction of the subsequent content portion from a remote web server at a given time; and displaying on the display at least part of the subsequent content portion without displaying the first content portion.

17. The method of claim 16 wherein the linking web page comprises a first markup language file stored on a first remote server; wherein the linked web article comprises a second markup language file stored on a second remote web server.

18. The method of claim 16 further comprising downloading successive fractions of the subsequent content portion from a remote server based upon the at least one input device.

19. The method of claim 16 wherein the linking web page comprises a web feed aggregator page.

20. The method of claim 16, wherein portions of the first content portion before the subsequent content portion are not displayed when at least part of the subsequent content portion is displayed.

* * * * *